US012124981B2

(12) United States Patent
Owen et al.

(10) Patent No.: US 12,124,981 B2
(45) Date of Patent: Oct. 22, 2024

(54) COMPLIANCE INSPECTION (71) Applicant: Environmental 360, Inc., Murfreesboro, TN (US)

(72) Inventors: David Owen, Murfreesboro, TN (US); Mitchell Berkey, Fayetteville, GA (US)

(73) Assignee: EHSTracks LLC, Murfreesborro, TN (US)

( * ) Notice: Subject to any disclaimer, the term of this patent is extended or adjusted under 35 U.S.C. 154(b) by 205 days.

(21) Appl. No.: 17/405,105

(22) Filed: Aug. 18, 2021

(65) Prior Publication Data

US 2022/0058565 A1 Feb. 24, 2022

Related U.S. Application Data (60) Provisional application No. 63/068,542, filed on Aug. 21, 2020.

(51) Int. Cl.
*G06Q 10/0631* (2023.01)
*G06Q 10/20* (2023.01)
*G06Q 30/018* (2023.01)
*G01S 19/14* (2010.01)

(52) U.S. Cl.
CPC ..... *G06Q 10/063114* (2013.01); *G06Q 10/20* (2013.01); *G06Q 30/018* (2013.01); *G01S 19/14* (2013.01)

(58) Field of Classification Search
None
See application file for complete search history.

(56) References Cited

U.S. PATENT DOCUMENTS

| 9,444,805 | B1 * | 9/2016 | Saylor | H04L 63/08 |
| 2009/0157521 | A1 * | 6/2009 | Moren | G06Q 30/018 |
| | | | | 707/999.107 |
| 2014/0207417 | A1 * | 7/2014 | Messinger | G06Q 10/06311 |
| | | | | 702/187 |
| 2017/0154341 | A1 * | 6/2017 | Gilbertson | G06F 21/35 |
| 2019/0354551 | A1 * | 11/2019 | Gulati | G06Q 50/26 |

OTHER PUBLICATIONS

"GPS Based Maintenance and Inspection Management", Seiler Instrument, Jun. 5, 2013.

* cited by examiner

*Primary Examiner* — Cory W Eskridge
(74) *Attorney, Agent, or Firm* — Danielson Legal LLC (57) ABSTRACT Compliance inspection system and method. The compliance inspection system includes an interface for at least communicating an inspection assignment to an inspector, wherein the inspection assignment includes an inspection location indicting where an inspection is to occur and for receiving location data related to the inspector. The compliance inspection system also includes a processor executing instructions stored on a memory to analyze the received location data related to the inspector, verify the inspector is at the inspection location based on the analysis of the received location data, and receive inspection documentation related to the inspection from the inspector.

18 Claims, 6 Drawing Sheets

COMPLIANCE INSPECTION

CROSS REFERENCE TO RELATED APPLICATIONS

The present application claims the benefit of and priority to U.S. provisional application No. 63/068,542, filed on Aug. 21, 2020, the content of which is hereby incorporated by reference as if set forth in its entirety herein.

TECHNICAL FIELD

Embodiments described herein generally relate to systems and methods for performing inspections and, more particularly but not exclusively, to systems and methods for performing inspections in accordance with various regulatory or contractual requirements.

BACKGROUND

Environmental, Health, and Safety (EHS) regulations mandated by federal or state bodies require inspections of various types of equipment. These inspections are to, for example, verify proper operation, detect leaks or defects, document operational parameters associated with equipment, or the like. In many cases, a single environmental regulation may apply to hundreds of inspection locations or pieces of equipment at a facility.

Different types of equipment may also have varying inspection schedules and requirements. Documenting these locations and requirements for each type of equipment can be cumbersome and subject to errors.

Performing inspections may also require a significant amount of time because inspectors may need to walk, climb, or otherwise move to each inspection location. Inspectors must then answer questions associated with equipment, transcribe field notes to reporting forms, and communicate findings to the appropriate personnel. Training inspectors to find multiple inspection locations and answer questions for each type of equipment can be challenging and time consuming.

Paper inspection records are subject to mismanagement and are often lost or misplaced. Paper records may also include handwriting, which can be difficult to read. Yet another disadvantage of paper inspection records is that deadlines may be missed due to the lack of automated reminders.

A need exists, therefore, for systems and methods that overcome the disadvantages associated with existing inspection techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a compliance inspection system. The system includes an interface for at least communicating an inspection assignment to an inspector, wherein the inspection assignment includes an inspection location indicating where an inspection is to occur and receiving location data related to the inspector, and a processor executing instructions stored on a memory to analyze the received location data related to the inspector, verify the inspector is at the inspection location based on the analysis of the received location data, and receive inspection documentation related to the inspection from the inspector.

In some embodiments, the processor is further configured to determine the inspector is not at the inspection location based on the analysis of the received location data, and issue a warning to the inspector indicating that the inspector is not at the inspection location.

In some embodiments, the processor verifies that the inspector is at the inspection location by determining that the inspector is within a prescribed distance from the inspection location.

In some embodiments the inspection assignment is communicated as a map of a facility that includes an indicia to indicate the inspection location In some embodiments, the processor is further configured to autonomously generate a work order based on the received inspection documentation.

In some embodiments, the inspection assignment is presented to the inspector as a form specific to the inspection assignment and satisfies one or more equipment regulatory requirements.

In some embodiments, the location data is received via a global navigation satellite system.

In some embodiments, the interface is further configured to receive a modification to the inspection assignment from the inspector.

In some embodiments, the processor is further configured to communicate the received inspection documentation to a remote storage for later retrieval.

In some embodiments, the received inspection documentation includes imagery of the inspection location.

According to another aspect, embodiments relate to a method for performing a compliance inspection. In some embodiments, the method includes communicating an inspection assignment to an inspector using an interface, wherein the inspection assignment includes an inspection location indicting where an inspection is to occur; receiving, using the interface, location data related to the inspector; analyzing, using a processor executing instructions stored a memory, the received location data related to the inspector; verifying, using the processor, that the inspector is at the inspection location based on the analysis of the received location data; and receiving inspection documentation related to the inspection from the inspector.

In some embodiments, the method further includes determining the inspector is not at the inspection location based on the analysis of the received location data and issuing a warning to the inspector indicating that the inspector is not at the inspection location.

In some embodiments, verifying that the inspector is at the inspection location includes determining that the inspector is within a prescribed distance from the inspection location.

In some embodiments, the inspection assignment is communicated as a map of a facility that includes an indicia to indicate the inspection location.

In some embodiments, the method further includes autonomously generating, using the processor, a work order based on the received inspection documentation.

In some embodiments, the inspection assignment is presented to the inspector as a form specific to the inspection assignment and satisfies one or more equipment regulatory requirements.

In some embodiments, receiving the location data related to the inspector includes receiving data from a global navigation satellite system.

In some embodiments, the method further includes receiving at the interface a modification to the inspection assignment from the inspector.

In some embodiments, the method further includes communicating the received inspection documentation to a remote storage for later retrieval.

In some embodiments, the received inspection documentation includes imagery of the inspection location.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

As discussed above, there are several disadvantages with existing techniques for conducting compliance inspections. These may include disadvantages associated with scheduling, note keeping, managing details associated with individual equipment types, or the like.

Embodiments described herein provide novel systems and methods for conducting inspections. These inspections may refer to inspections at various types of facilities with different types of equipment. Embodiments herein may help ensure compliance in applications such as spill prevention, control, and countermeasures; leak detection and repair; storm water management; continuous emissions monitoring systems; solid or hazardous waste management; and air-related regulations.

Figure 1:
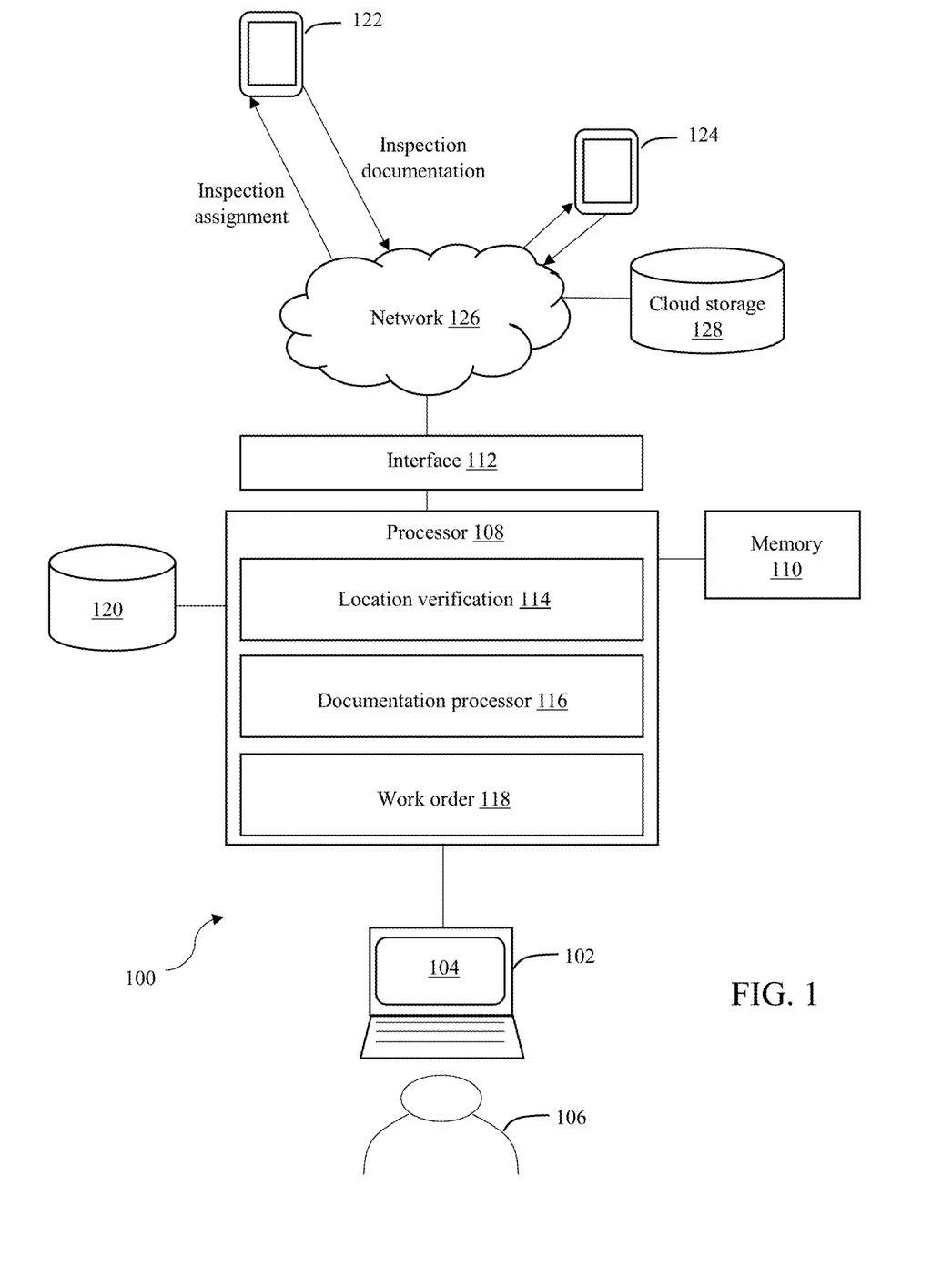
FIG. 1 illustrates a compliance inspection system in accordance with one embodiment.

FIG. 1 illustrates a compliance inspection system 100 in accordance with one embodiment. The system 100 may include a user device 102 executing a user interface 104 to allow a user 106 to manage inspection assignments.

The user device 102 may include an input/output (I/O) device such as, but not limited to, a laptop, PC, tablet, smartphone, smartwatch, or any other type of device that can execute the user interface 104 to allow the user 106 to provide parameters regarding inspection assignments and view data related to inspection assignments. The user device 102 may be located at a facility at which inspections are to occur or at some remote location.

The user 106 may be an administrator tasked with managing inspections of equipment at a facility. The user 106 may create inspection assignments, view inspection scheduling, view results of inspections, or the like.

The user interface 104 may present a dashboard that shows compliance calendars, compliance statuses, upcoming inspections, overdue inspections, corrective actions, upcoming compliance plan updates, and other relevant information for multiple sites or facilities. All inspection location data, inspection data, user data, inspector data, and reports may be accessed from this dashboard.

The user device 102 may be in operable connectivity with one or more processors 108. The processor(s) 108 may be any hardware device capable of executing instructions stored on memory 110 to provide various components or modules. The processor 108 may include a microprocessor, a field programmable gate array (FPGA), an application-specific integrated circuit (ASIC), or other similar devices.

In some embodiments, such as those relying on one or more ASICs, the functionality described as being provided in part via software may instead be configured into the design of the ASICs and, as such, the associated software may be omitted. The processor 108 may be configured as part of the user device 102 (e.g., a laptop) or located at some remote location.

The memory 110 may be L1, L2, L3 cache, or RAM memory configurations. The memory 110 may include non-volatile memory such as flash memory, EPROM, EEPROM, ROM, and PROM, or volatile memory such as static or dynamic RAM, as discussed above. The exact configuration/type of memory 110 may of course vary as long as instructions for performing compliance inspections can be performed by the system 100.

The system 100 may also include an interface 112 to receive data from and communicate data across one or more networks 126. The processor 108 may include or otherwise execute a location verification module 114, a documentation processor 116, and a work order generator 118. The processor 108 may also be in communication with one or more databases 120 that store forms for completion by an inspector as part of an inspection assignment. The database(s) 120 may also store data regarding inspection schedules, results of previous inspections, or the like.

The processor 108 may be in operable connectivity with one or more inspection devices 122 and 124 over one or more networks 126. The network(s) 126 may link the various components with various types of network connections. The network(s) 126 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network or networks 126 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The inspector devices 122 and 124 may be operated by an inspectors in the field as they perform inspections in accordance with inspection assignments. The inspector device 122 may be configured as a tablet, smartphone, laptop, smartwatch, smart glasses, or any other type of device whether available now or invented hereafter as long as they enable an inspector to view data regarding inspection assignments and provide data regarding inspections. Inspectors may provide inspection documentation regarding an inspection to the user 106 or to a cloud storage 128 for later retrieval or viewing.

In operation, the user 106 may create an inspection assignment via the user interface 104. The inspection assignment may include a schedule that specifies a particular piece of equipment to be inspected, the location of the inspection, when the equipment should be inspected, the frequency of which it should be inspected (e.g., once a week, month, etc.), what the inspection should entail, and any other notes or information regarding the inspection.

The inspection assignment may also include an inspection form to be completed by an inspector for each inspection. The questions on the form(s) may be created by the user 106 or otherwise by professionals with knowledge of regulations related to particular type of equipment. For example, an inspection form may be created by a governing or administrative entity. The created form(s) may be tailored to a specific type of equipment and may prompt an inspector to provide certain information to satisfy regulatory or contractual requirements.

The forms may be stored in the form database 120 and provided to an inspector device 122. For example, an inspection assignment may include or at least indicate which form should be used for a particular inspection.

The embodiments herein may involve a set-up phase in which a user or inspector travels throughout a facility to gather information relevant to the entire site. This information may be used by other users or by inspectors that will perform the inspections.

During this phase, users such as inspection set-up personnel may walk the entire site to identify equipment and applicable inspection locations. Each piece of equipment or inspection location may be highlighted on an aerial photo or otherwise on a facility map with some indicia as discussed below. A pop-up window associated with the indicia may also be populated with the information required for each type of inspection location or applicable piece of equipment. The embodiments herein may also provide a set-up form to allow a user to create an inspection form by inputting initial, set-up information.

Figure 2:
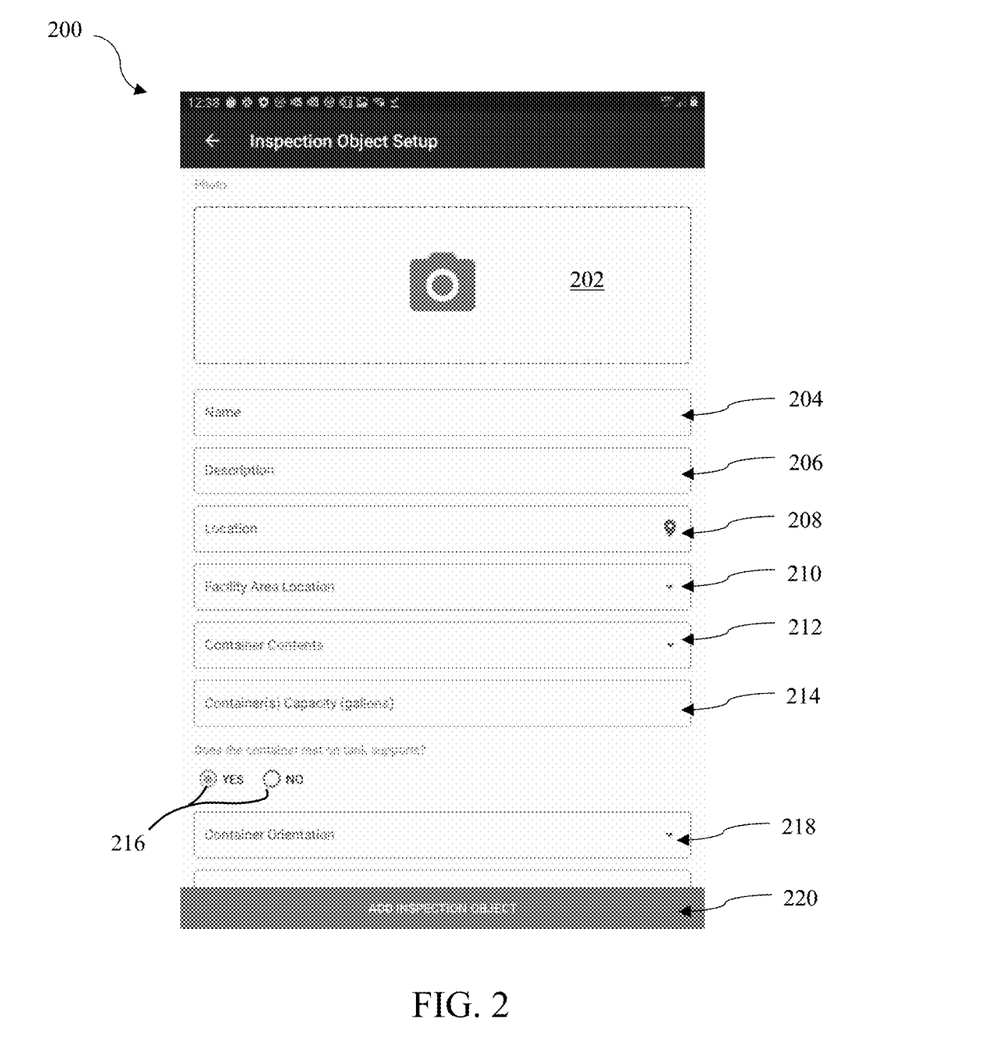
FIG. 2 illustrates a set-up form in accordance with one embodiment.

FIG. 2 illustrates a set-up form 200 in accordance with one embodiment. This type of form may be accessed by a user 106 to create an inspection assignment. For example, the user 106 may populate the form 200 for a particular inspection location, and data from said populated form may be used to create an inspection assignment. In some embodiments, the data from the populated form 200 may be used to create an inspection from to aid an inspector in completing the inspection assignment.

The set-up form 200 may include an imagery prompt 202 to prompt a user to gather imagery of equipment at an inspection location. An image of the inspection location (i.e., equipment at the inspection location) may assure an inspector they are at the correct inspection location during future inspections.

The user may populate fields for a name 204, a description of an inspection assignment 206, the geographic inspection location (e.g., the facility location) 208, the location at the facility 210, the contents of a container to be inspected 212, the capacity of the container to be inspected 214, etc.

The form 200 may also include radio buttons 216 that prompt a user to answer a question. As seen in form 200, the user is asked whether the container rests on tank supports. This may affect which questions are presented to the inspector or otherwise may impact which regulatory requirements are applicable.

The form 200 may further include an entry field for an inspector to input the container orientation 218. The form 200 may also include an "add inspection object" button 220 that, if selected, allows a user 106 to add a new field.

The set-up form 200 of FIG. 2 is merely exemplary. Set-up forms used in accordance with the embodiments herein may be formatted differently, use different input attributes (e.g., radio buttons, text fields, drop-down menus, Boolean values, etc.), include different questions, or otherwise allow a user to input different types of information. The type of questions or inputted information may vary and may depend on the type of equipment to be inspected.

For example, if the equipment to be inspected is an oil tank, the inspector may need to inspect the tank in accordance with Chapter 7 of the "Spill Prevention, Control, and Countermeasure (SPCC) Guidance for Regional Inspectors" established by the United States Environmental Protection Agency. These regularly-scheduled inspections may require that an inspector perform a visual inspection, radiographic examination, ultrasonic testing, helium leak testing, magnetic particle examination, acoustic emissions testing, inert gas leak testing, or the like.

An inspection form communicated to the inspector may at the very least instruct the inspector to perform these required inspection tasks. The form may include questions or instructions to, for example, "conduct ultrasonic testing," and may also include questions such as, "does ultrasonic testing indicate any defects?" The inspector may then answer the question as "yes" or "no."

Accordingly, the inspection assignment communicated to an inspector device 124 may include which equipment should be inspected, when the equipment should be inspected, where the equipment is located, notes regarding how the inspection should be performed, a form to be completed as part of the inspection, etc. The inspection form may be based at least in part on the set-up form 200 of FIG. 2.

The user 106 may manually assign an inspection to an inspector via the user interface 104. Additionally or alternatively, the system 100 may autonomously communicate inspection assignments to an inspector. For example, at the start of each day or week the processor 108 may communicate upcoming inspection assignments to an inspector.

The inspector device 122 may issue any type of alert informing the inspector of a received inspection assignment. The alert may be a visual alert, an audio alert, a haptic-based alert, or some combination thereof.

Figure 3:
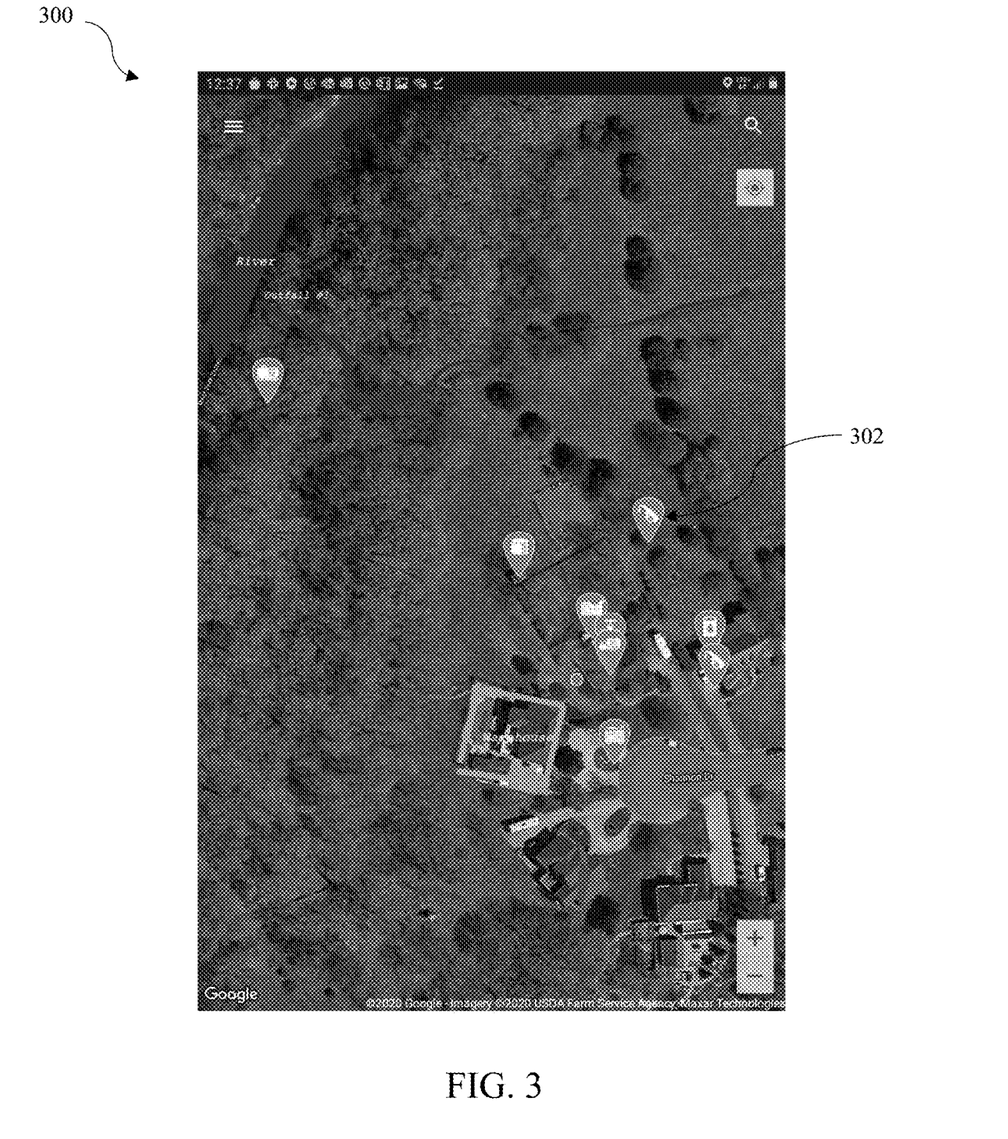
FIG. 3 illustrates a facility map in accordance with one embodiment.

The inspection assignment may include an inspection form as discussed previously. The inspection assignment may also include one or more maps to assist the inspector in finding the inspection location(s). FIG. 3 illustrates a facility map 300 (i.e., an aerial photo of the facility) in accordance with one embodiment. To assist the inspector in locating the inspection locations, the map 300 may include one or more indicia 302 to pinpoint where an inspection is required. Each indicia may also include an icon to indicate the type of equipment at the inspection location.

Upon arriving at an inspection location, the inspector may touch a location on the map on their inspector device 122 that corresponds to the inspection location. That is, the inspector may highlight an icon on the map that represents the inspection location or a piece of equipment to be inspected.

The indicia may also change color to indicate its inspection status. For example, if no inspections for a location are scheduled or required, the associated indicia may be gray. Before an inspector performs a required inspection at a location, the associated indicia may be red. During an inspection, the indicia may change to yellow. Once an inspection is completed, the indicia may be green.

Other colors may be used to represent other information. For example, the indicia may be orange to indicate that an inspection has been completed but there is a defect associated with the inspected equipment. This allows inspectors and other interested parties to glance at a map and quickly understand the status of one or more inspection locations.

Data associated with the inspection or the inspection documentation may be saved in real-time so that an inspector can stop and start inspections without losing data. Inspections can be resumed at any time, subject to any applicable compliance deadlines.

A map such as the one of FIG. 3 may be viewable on a screens of the inspector device 122 and user device 102 and may show the location of the inspector and the inspection locations. The inspector may navigate to the inspection location by using the map on the screen.

The inspector device 122 may include Global Navigation Satellite System (GNSS) functionality to verify that the inspector is at the appropriate inspection location. This ensures, for example, the inspector inspects the correct equipment as specified by the inspection assignment. The GNSS technology may include, for example, functionality provided by GPS, GLONASS, Galileo, or any other type of GNSS technology whether available now or invented hereafter.

The processor 108 of FIG. 1 may include or otherwise execute the location verification module 114 to analyze data regarding the inspector's physical location. For example, the location verification module 114 may analyze GPS data associated with the inspector device 122 and compare it to known inspection locations.

In some embodiments, the inspector must be within a pre-determined distance from the inspection location while completing the inspection assignment. This at the very least ensures that the inspector is inspecting the correct piece of equipment.

The location verification module 114 may detect whether the inspector is in the correct inspection location based on known inspection locations and any proximity requirements. If the location verification module 114 determines the inspector is not in the correct location (e.g., as determined by geographical coordinates associated with the inspector device 122), the processor 108 may communicate a warning for presentation by the inspector device 122 informing the inspector they are not located as required. For example, the inspector may be presented with a message such as "move closer to the inspection location." This warning may appear until the inspector moves within the required distance.

Additionally or alternatively, an inspector may scan a bar code or a QR code at the inspection location to indicate their presence at the inspection location. In some embodiments, the inspector can scroll through or search a list of inspection locations to find and select the applicable inspection location. Additionally, the inspector device 122 may present imagery (e.g., one or more photos) of the equipment to be inspected to help the instructor find the correct inspection location.

The inspection questions may be presented on the screen of the inspector device 122 once the inspector's location is verified. The questions may presented as a form similar to the form 200 of FIG. 2. For example, an inspection form may indicate the equipment type, and include questions about the equipment.

To complete the inspection assignment, the inspector may answer questions using e.g., "yes" or "no" buttons presented on their inspector device 122. If a "no" answer is selected, it may indicate a defect with the inspected equipment and the inspector may choose from a list of common defects by clicking all defects that apply. If an "other" option is selected, the inspector may provide a description of the defect(s) or other notes regarding the inspection.

An inspector may also modify inspection assignments. The inspector may change an inspection assignment if, for example, the inspection assignment included instructions that are not applicable to an assignment location. As another example, an inspector may add an inspection assignment while walking through a facility. That is, if the inspector notices equipment that is not scheduled to be inspected but nonetheless appears to have a defect, the inspector could add an inspection assignment via their inspection device and conduct an inspection.

Once an inspection is complete, inspection documentation may be dated, timestamped, and submitted. In some embodiments, the inspection documentation may be transmitted over the network(s) 126 to the processor 108 or the cloud storage 128. If a wireless connection is not available, the inspection documentation may be stored locally on the inspector device 122. The inspection documentation may be synced or otherwise uploaded once a connection is established. Once inspection documentation is stored in the cloud storage 128, it can be remotely accessed by interested parties with authorized access.

Figure 4:
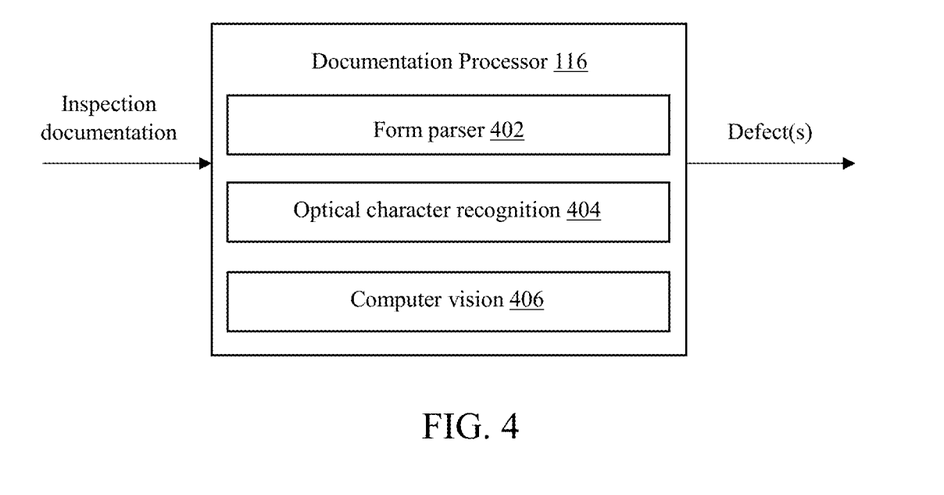
FIG. 4 illustrates the documentation processor 116 of FIG. 1 in accordance with one embodiment.

The documentation processor 116 may analyze the inspection documentation once received. FIG. 4 illustrates the documentation processor 116 of FIG. 1 in accordance with one embodiment. As seen in FIG. 4, the documentation processor 116 may include or otherwise execute a form parser 402, an optical character recognition (OCR) engine 404, and a computer vision engine 406.

The form parser 402 may review inspection documentation answers to determine the meaning of any values associated with an answer, such as an answer to a "yes/no" question. For example, the form parser 402 may identify whether the inspector provided a "no" answer or otherwise provided an answer that indicates a defect of the inspected equipment.

The OCR engine 404 may review any text provided by the inspector as part of the inspection. The OCR engine 404 may analyze any typed or handwritten notes (e.g., provided by a stylus on a touchscreen of the inspector device 124) related to an inspection. The OCR engine 404 may therefore recognize the meaning of any provided text, such as what the inspector wrote about any noticed defects.

The computer vision engine 406 may execute any appropriate computer vision algorithms to analyze gathered imagery related to an inspection. For example, the inspector may have taken one or more photos or videos as part of the inspection. The computer vision engine 406 may execute, for example, scale-invariant feature transform algorithms, speeded up robust feature algorithms, gradient location and orientation histogram algorithms, or some combination thereof to analyze gathered imagery. The computer vision engine 406 may at the very least provide an extra level of scrutiny to detect defects such as leaks that may go unnoticed by the inspector.

The documentation processor 116 may consider outputs of the engines 402-406 in combination to determine whether a defect exists. For example, the form parser 402 may not identify any answers that indicate a defect, but the outputs of the OCR engine 404 and the computer vision engine 406 may indicate there may be a defect that warrants attention.

The output of the documentation processor 116 may be whether any defects exist with respect to an inspection. Any determined defects may be communicated to the work order generator 118 of FIG. 1.

The work order generator 118 may autonomously or at least semi-autonomously generate any required work orders based on output from the documentation processor 116. If a particular defect is found with an inspection location, the work order generator 118 may generate and schedule a new assignment to remedy the defect. The work order generator 118 may use information associated with the original inspection assignment or inspection documentation to, for example, populate a form with information regarding the inspection location, the severity of the defect, how quickly the defect should be remedied, what the remedy will entail, or the like.

Figure 5:
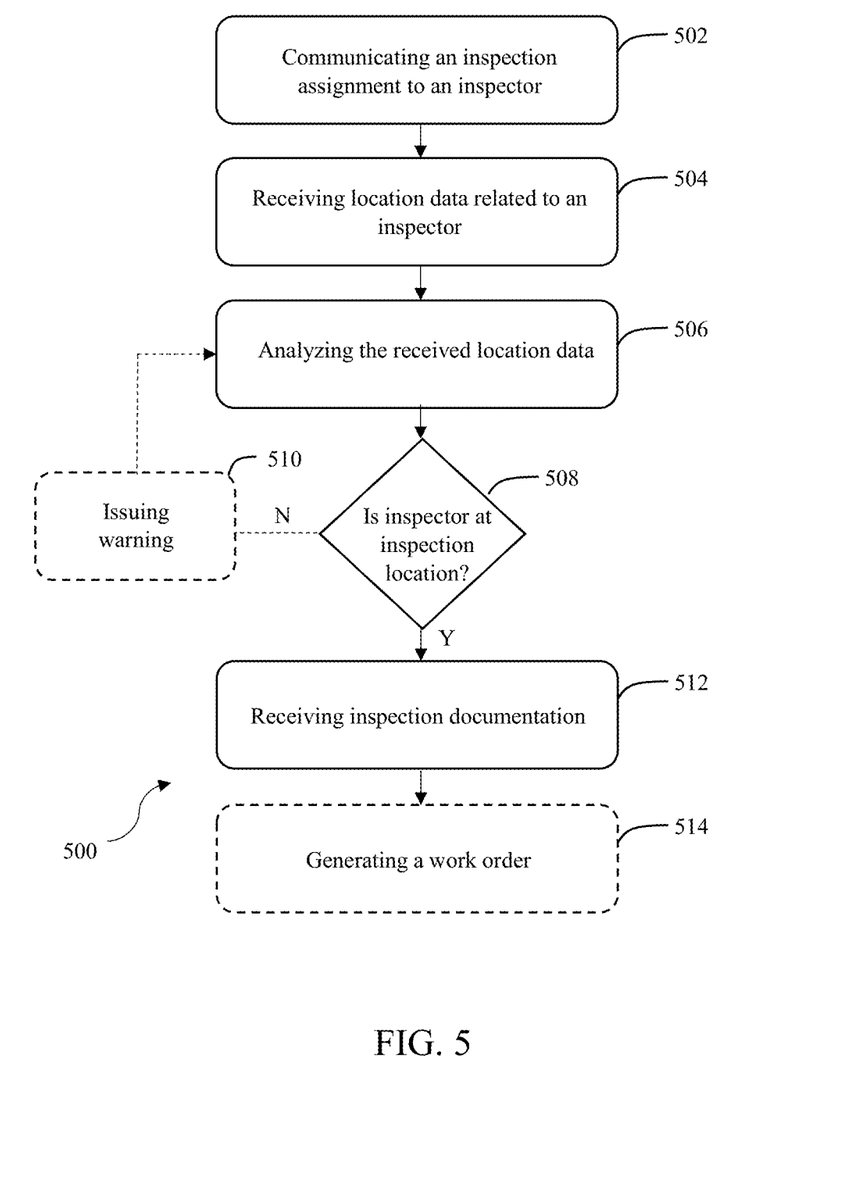
FIG. 5 depicts a flowchart of a method for performing a compliance inspection in accordance with one embodiment.

FIG. 5 depicts a flowchart of a method 500 for performing a compliance inspection in accordance with one embodiment. The system 100 of FIG. 1 or components thereof may perform the steps of method 500.

Step 502 involves communicating an inspection assignment to an inspector using an interface, wherein the inspection assignment includes an inspection location indicting where an inspection is to occur. The inspection assignment may be communicated to an inspection device such as the inspection device 124 of FIG. 1 for viewing by an inspector. In addition to indicating a location inspection, the inspection assignment may include information such as the type of equipment to be inspected, the deadline for inspection, notes or instructions related to the inspection, or the like.

The inspection assignment may also include a map of a facility in which the equipment is located. The map may include an indicia to inform the inspector where the equipment is located (i.e., the inspection location).

Step 504 involves receiving, using the interface, location data related to the inspector. The inspector may carry a GNSS device that broadcasts the inspector's location. In some embodiments, the inspector may operate an inspector device such as the inspector device 124 of FIG. 1. The inspector device may be configured as, for example, a tablet that includes GNSS functionality to broadcast its location.

Step 506 involves analyzing, using a processor executing instructions stored a memory, the received location data related to the inspector. The location data may be presented to a user as a moving pin on a map of the facility so that the user can monitor the location of an inspector. Additionally or alternatively, a location verification module such as the location verification module 116 of FIG. 1 may analyze data such as GPS coordinates and compare said data to known inspection locations.

Figure 6:
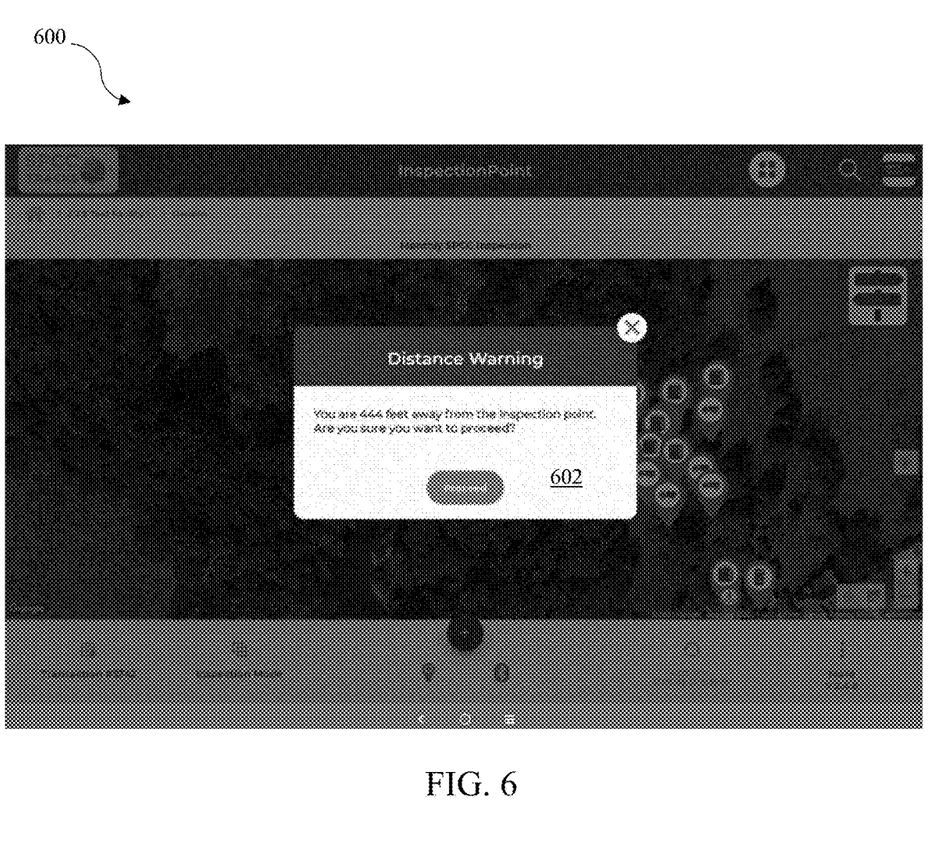
FIG. 6 presents a screenshot of an inspection interface 600 in accordance with one embodiment.

Step 508 involves verifying, using the processor, that the inspector is at the inspection location based on the analysis of the received location data. If the inspector is not at the inspection location (e.g., not within a predetermined distance from the inspection location), the method 500 may proceed to step 510 which involves issuing a warning to the inspector indicating that the inspector is not at the inspection location. For example, FIG. 6 presents a screenshot of an inspection interface 600 in accordance with one embodiment. If the inspector is too far from an inspection point (i.e., an inspection location), the interface 600 may present a warning message 602 to the inspector about their location.

As seen in FIG. 6, the message 602 may be "You are 444 feet away from the inspection point. Are you sure you want to proceed?" The inspector may then indicate they wish to proceed and/or move closer to the inspection point. As the inspector moves closer to the inspection point, the message 602 may update to reflect the change in distance between the inspector and the inspection point. Method 500 may iterate the steps 506-10 until the inspector is at the inspection location.

The message 602 of FIG. 6 is merely exemplary and other messages may be used. For example, in some embodiments, the message 602 may not give the inspector the option to proceed until they are within a threshold distance from the inspection point.

Upon verifying that the inspector is at the inspection location in step 508, method 500 may proceed to step 512 which involves receiving inspection documentation related to the inspection from the inspector. The inspection documentation may represent the results of the inspection and may indicate whether any defects have been discovered.

Step 514 is optional and involves autonomously generating a work order based on the received inspection documentation. A generated work order may include all relevant information such as the equipment pertaining to the work order, the equipment location, the defect(s) to be remedied, or the like.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:
1. A compliance inspection system comprising:
an interface configured for:

populating a form with data received from an operator at the interface, the received data including an asset for inspection and the location of the asset for inspection;

creating an inspection assignment and an inspection form from the populated form, wherein the inspection form contains inspection steps that are retrieved from a database and are specific to the asset for inspection;

autonomously communicating the inspection form and the inspection assignment to an inspection device associated with an inspector, wherein the inspection assignment includes the location of the asset for inspection, and receiving location data related to the inspector from the inspection device, the location data originating with a global navigation satellite system; and a processor executing instructions stored on a memory to:

analyze the received location data from the inspection device;

autonomously verify the inspector is at the location of the asset for inspection by comparing the location data received from the inspection device to the location of the asset for inspection from the populated form;

repeat the steps of analyzing the received location data and verifying the location of the inspector while the inspection is being conducted; and receive inspection documentation related to the inspection from the inspector subsequent to verifying the inspector is at the location of the asset;

autonomously generate and issue a work order based on the received inspection documentation.

2. The system of claim 1 wherein the processor is further configured to:

determine the inspector is not at the location of the asset based on the analysis of the received location data, and issue a warning to the inspector indicating that the inspector is not at the location of the asset.

3. The system of claim 1 wherein the processor verifies that the inspector is at the location of the asset by determining that the inspector is within a prescribed distance from the location of the asset.

4. The system of claim 1 wherein the inspection assignment is communicated as a dynamic map of a facility that includes an indicium to indicate the location of the asset and to present the location data in real time.

5. The system of claim 1 wherein the inspection assignment is presented to the inspector as a form specific to the inspection assignment and satisfies one or more equipment regulatory requirements.

6. The system of claim 1 wherein the location data is received via a global navigation satellite system.

7. The system of claim 1 wherein the interface is further configured to receive a modification to the inspection assignment from the inspector.

8. The system of claim 1 wherein the processor is further configured to communicate the received inspection documentation to a remote storage for later retrieval.

9. The system of claim 1 wherein the received inspection documentation includes imagery of the location of the asset.

10. A method for performing a compliance inspection, the method comprising:

populating a form with data received from an operator at an interface, the received data including an asset for inspection and the location of the asset for inspection;

creating an inspection assignment and an inspection form from the populated form, wherein the inspection form contains inspection steps that are retrieved from a database and are specific to the asset for inspection autonomously communicating the inspection form and the inspection assignment to an inspection device associated with an inspector, wherein the inspection assignment includes the location of the asset;

receiving, using the interface, location data from the inspection device;

analyzing, using a processor executing instructions stored a memory, the received location data from the inspection device;

autonomously verifying, using the processor, that the inspector is at the location of the asset for inspection by comparing the location data received from the inspection device to the location of the asset for inspection from the populated form;

repeating the steps of analyzing the received location data and verifying the location of the inspector while the inspection is being conducted;

receiving inspection documentation related to the inspection from the inspector subsequent to verifying the inspector is at the location of the asset; and autonomously generating and issuing a work order based on the received inspection documentation.

11. The method of claim 10 further comprising:

determining the inspector is not at the location of the asset based on the analysis of the received location data; and issuing a warning to the inspector indicating that the inspector is not at the location of the asset.

12. The method of claim 10 wherein verifying that the inspector is at the location of the asset includes determining that the inspector is within a prescribed distance from the location of the asset.

13. The method of claim 10 wherein the inspection assignment is communicated as a dynamic map of a facility that includes an indicium to indicate the location of the asset and to present the location data in real time.

14. The method of claim 10 wherein the inspection assignment is presented to the inspector as a form specific to the inspection assignment and satisfies one or more equipment regulatory requirements.

15. The method of claim 10 wherein receiving the location data related to the inspector includes receiving data from a global navigation satellite system.

16. The method of claim 10 further comprising receiving at the interface a modification to the inspection assignment from the inspector.

17. The method of claim 10 further comprising communicating the received inspection documentation to a remote storage for later retrieval.

18. The method of claim 10 wherein the received inspection documentation includes imagery of the location of the asset.

* * * * *